United States Patent
Zhang et al.

(10) Patent No.: US 9,953,506 B2
(45) Date of Patent: Apr. 24, 2018

(54) ALARMING METHOD AND DEVICE

(71) Applicant: Xiaomi Inc., Beijing (CN)

(72) Inventors: Tao Zhang, Beijing (CN); Zhijun Chen, Beijing (CN); Pingze Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/069,949

(22) Filed: Mar. 14, 2016

(65) Prior Publication Data

US 2017/0124833 A1    May 4, 2017

(30) Foreign Application Priority Data

Oct. 28, 2015 (CN) .......................... 2015 1 0713143

(51) Int. Cl.
*G08B 21/02* (2006.01)
*G08B 25/01* (2006.01)
(Continued)

(52) U.S. Cl.
CPC ........... *G08B 21/0208* (2013.01); *G08B 5/22* (2013.01); *G08B 25/008* (2013.01); *G08B 25/014* (2013.01)

(58) Field of Classification Search
CPC .. H04N 7/181; H04N 21/251; H04N 21/4415; H04N 21/44218; H04N 2201/3246; H04N 5/76; H04N 7/18; H04N 7/188; G06K 9/00228; G06K 2009/00738; G06K 9/6228; G08B 13/19641; G08B 13/19645; G08B 13/19682; G08B 13/19693; G08B 13/19602;
(Continued)

(56) References Cited

U.S. PATENT DOCUMENTS 4,511,886 A  *  4/1985  Rodriguez ....... G08B 13/19645
                                              340/506
4,814,869 A  *  3/1989  Oliver, Jr. ........ G08B 13/19634
                                              348/159
(Continued)

FOREIGN PATENT DOCUMENTS

CN          101252680 A       8/2008
CN          101840422 A       9/2010
(Continued)

OTHER PUBLICATIONS

International Search Report in international application No. PCT/CN2015/099586, dated Feb. 29, 2016.
(Continued)

*Primary Examiner* — Fekadeselassie Girma
(74) *Attorney, Agent, or Firm* — Jun He Law Offices P.C.; James J. Zhu

(57) ABSTRACT

Described are an alarming method and device, belonging to the technical field of Internet. The method includes: acquiring a monitoring video from a photographing device, wherein the photographing device captures the monitoring video by monitoring a region including a sensitive area; judging whether a monitoring target exists in the sensitive area by analyzing the monitoring video; and when the monitoring target exists in the sensitive area, sending alarming information to a terminal device to enable the terminal device to prompt alarm.

3 Claims, 9 Drawing Sheets

(51) Int. Cl.
*G08B 5/22* (2006.01)
*G08B 25/00* (2006.01)

(58) Field of Classification Search
CPC .......... G08B 13/19608; G08B 13/1961; G08B 13/19613; G06F 21/32
USPC ................................... 340/506, 8.1
See application file for complete search history.

(56) References Cited

U.S. PATENT DOCUMENTS

| | | | | |
|---|---|---|---|---|
| 4,943,854 | A * | 7/1990 | Shiota | G08B 13/19641 348/159 |
| 4,992,866 | A * | 2/1991 | Morgan | G08B 13/19641 340/3.71 |
| 5,164,979 | A * | 11/1992 | Choi | G08B 13/19634 340/533 |
| 6,618,074 | B1 * | 9/2003 | Seeley | H04N 7/181 340/506 |
| 8,749,347 | B1 | 6/2014 | Newman | |
| 9,106,789 | B1 * | 8/2015 | Shipman, Jr. | H04N 7/147 |
| 2006/0083305 | A1 * | 4/2006 | Dougherty | H04N 5/145 375/240.12 |
| 2007/0237358 | A1 * | 10/2007 | Tseng | G08B 13/19608 382/103 |
| 2008/0307483 | A1 * | 12/2008 | Iida et al. | H04L 65/4015 725/131 |
| 2010/0205667 | A1 * | 8/2010 | Anderson | G06F 3/013 726/19 |
| 2010/0238286 | A1 * | 9/2010 | Boghossian | G06K 9/00771 348/143 |
| 2011/0032355 | A1 * | 2/2011 | Tong | G08B 13/19602 348/143 |
| 2011/0275045 | A1 * | 11/2011 | Bhupathi | G09B 19/003 434/247 |
| 2013/0091213 | A1 * | 4/2013 | Diab | G06Q 50/01 709/204 |
| 2013/0204408 | A1 * | 8/2013 | Thiruvengada | G06F 3/011 700/90 |
| 2013/0317944 | A1 * | 11/2013 | Huang | G01S 5/0252 705/26.61 |
| 2014/0050455 | A1 * | 2/2014 | Ni | H04N 9/8227 386/224 |
| 2014/0258117 | A1 * | 9/2014 | Holland | G06Q 20/108 705/42 |
| 2015/0123767 | A1 * | 5/2015 | Tolle | G06K 19/07758 340/5.85 |
| 2015/0373307 | A1 * | 12/2015 | Huang | H04N 7/183 348/155 |
| 2016/0156854 | A1 * | 6/2016 | Yang | H04N 5/272 348/239 |
| 2016/0180239 | A1 * | 6/2016 | Frankel | G06T 7/20 706/12 |
| 2016/0224853 | A1 * | 8/2016 | Xiong | G06F 21/32 |
| 2016/0337696 | A1 * | 11/2016 | Lee | G06F 3/14 |
| 2016/0350334 | A1 * | 12/2016 | Bataller | G06K 9/6228 |
| 2016/0350611 | A1 * | 12/2016 | Zhang | G06K 9/00248 |

FOREIGN PATENT DOCUMENTS

| | | |
|---|---|---|
| CN | 101872524 A | 10/2010 |
| CN | 102158689 A | 8/2011 |
| CN | 102868875 A | 1/2013 |
| CN | 103188474 A | 7/2013 |
| CN | 103607569 A | 2/2014 |
| CN | 103714648 A | 4/2014 |
| CN | 104636709 A | 5/2015 |
| CN | 104767911 A | 7/2015 |
| CN | 104933827 A | 9/2015 |
| JP | 2009055447 A | 3/2009 |
| JP | 2010072708 A | 4/2010 |
| JP | 2014092961 A | 5/2014 |
| JP | 2015176198 A | 10/2015 |
| KR | 101207197 B1 | 12/2012 |
| KR | 101380628 B1 | 4/2014 |
| KR | 101394242 B1 | 5/2014 |
| RU | 2271577 C1 | 3/2006 |

OTHER PUBLICATIONS

Rogerio S Feris: "Chapter 3: Case Study:IBM Smart Surveillance System", Dec. 15, 2010 (Dec. 15, 2010), Intelligent Video Surveillance: Systems and Technology, p. 47-76, XP008147108.

Marco Leo et al: "Real-time smart surveillance using motion analysis",Expert Systems.,vo 1. 27, No. 5, Oct. 21, 2010 (Oct. 21, 2010), pp. 314-337, XP055342458.

The Partial Supplementary European Search Report in European application No. 16162165.1, dated Mar. 2, 2017.

Notification of the First Office Action of Russian application No. 2016117967 with English abstract, dated Sep. 21, 2017.

Notification of the First Office Action of Japanese application No. 2016-549719, dated Dec. 22, 2017.

English Translation of the Notification of the First Office Action of Russise application No. 2016117967, dated Feb. 14, 2018.

* cited by examiner

ALARMING METHOD AND DEVICE

CROSS-REFERENCE TO RELATED APPLICATIONS

This application is filed based upon and claims priority to Chinese Patent Application No. 201510713143.1, filed on Oct. 28, 2015, the entire contents of which are incorporated herein by reference.

TECHNICAL FIELD

The present disclosure generally relates to the technical field of Internet, and more particularly, to an alarming method and device.

BACKGROUND

Along with the popularization of cameras, real-time monitoring with a camera becomes more and more popular. A camera may acquire an image in a monitoring area during real-time monitoring, while there may usually exist a sensitive area, such as a vicinity of a socket, a door and a window and the like. In the monitoring area of the camera, an unsafe event may occur when a specific object is located in the sensitive area, for example, it may be dangerous when a child is located nearby the socket, so that there is an urgent need for an alarming method which may prevent occurrence of an unsafe event.

SUMMARY

According to a first aspect of an embodiment of the present disclosure, an alarming method implemented by a server is provided, which includes: acquiring a monitoring video from a photographing device, wherein the photographing device captures the monitoring video by monitoring a region including a sensitive area; judging whether a monitoring target exists in the sensitive area by analyzing the monitoring video; and when the monitoring target exists in the sensitive area, sending alarming information to a terminal device to enable the terminal device to prompt alarm.

According to a second aspect of an embodiment of the present disclosure, an alarming method is provided by a terminal device, which includes: sending setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and prompting alarm based on the alarming information after receiving the alarming information from the server.

According to a third aspect of an embodiment of the present disclosure, a server is provided, which includes: a processor; and a memory configured to store instructions executable by the processor, wherein the processor may be configured to: acquire a monitoring video from a photographing device, wherein the photographing device captures the monitoring video by monitoring a region including a sensitive area; judge whether a monitoring target exists in the sensitive area by analyzing the monitoring video; and when the monitoring target exists in the sensitive area, send alarming information to a terminal device to enable the terminal device to prompt alarm.

According to a fourth aspect of an embodiment of the present disclosure, a terminal device is provided, which includes: a processor; and a memory configured to store instructions executable by the processor, wherein the processor may be configured to: send setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and prompt alarm based on the alarming information after receiving the alarming information from the server.

According to a fifth aspect of an embodiment of the present disclosure, a non-transitory computer-readable storage medium having stored therein instructions that, when executed by a processor of a server, causes the server to perform an alarming method, the method including: acquiring a monitoring video from a photographing device, wherein the photographing device captures the monitoring video by monitoring a region including a sensitive area; judging whether a monitoring target exists in the sensitive area by analyzing the monitoring video; and when the monitoring target exists in the sensitive area, sending alarming information to a terminal device to enable the terminal device to prompt alarm.

According to a sixth aspect of an embodiment of the present disclosure, a non-transitory computer-readable storage medium having stored therein instructions that, when executed by a processor of a terminal device, causes the terminal device to perform an alarming method, the method including: sending setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and prompting alarm based on the alarming information after receiving the alarming information from the server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
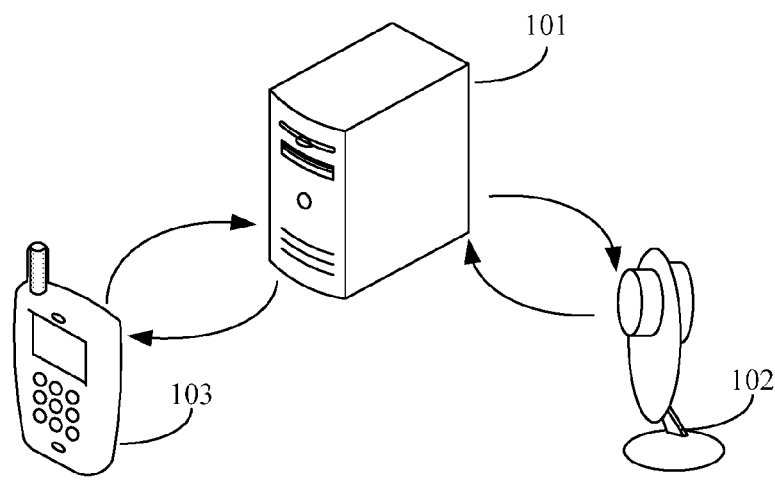
FIG. 1 is a schematic diagram illustrating an implementation environment involved in an alarming method, according to an exemplary embodiment.

FIG. 1 is a schematic diagram illustrating an implementation environment involved in an alarming method, according to an exemplary embodiment. As shown in FIG. 1, the implementation environment may include: a server 101, an intelligent photographic equipment 102 and a terminal device 103. The server 101 may be a server, may also be a server cluster consisting of a plurality of servers, and may further be a cloud computing service center. The intelligent photographic equipment 102 may be an intelligent camera. The terminal device 103 may be a mobile phone, a computer, a tablet and the like. The server 101 may be connected with the intelligent photographic equipment 102 through a network, and the server 101 may also be connected with the terminal device 103 through the network. The server 101 is configured to receive a monitoring video sent from the intelligent photographic equipment and send alarming information to the terminal device. The intelligent photographic equipment 102 is used to determine the monitoring video in a monitoring area and send the monitoring video to the server. The terminal device 103 is configured to receive the alarming information sent from the server and prompt alarm.

Figure 2:
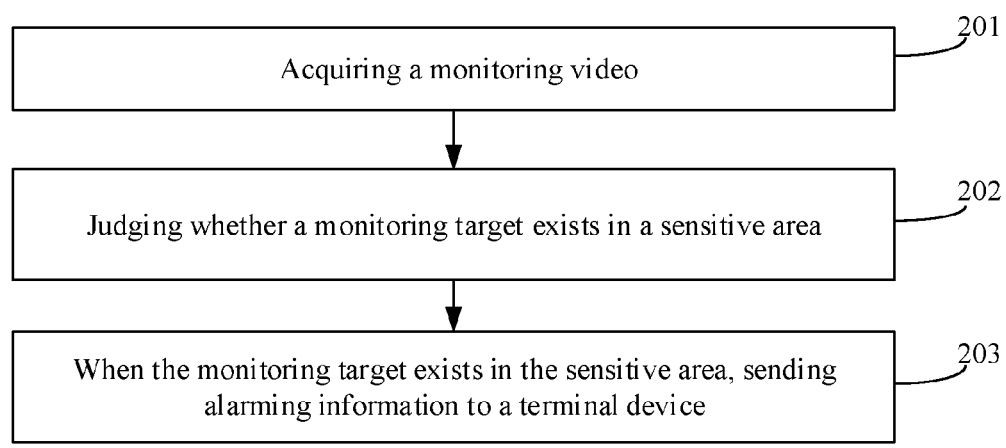
FIG. 2 is a flow chart showing an alarming method, according to an exemplary embodiment.

FIG. 2 is a flow chart showing an alarming method, according to an exemplary embodiment. As shown in FIG. 2, the method is implemented by a server, and includes the following steps.

At step 201, a monitoring video is acquired from a photographing device. Herein the photographing device captures the monitoring video by monitoring a region including a sensitive area.

At step 202, it is judged whether a monitoring target exists in a sensitive area by analyzing the monitoring video.

At step 203, when the monitoring target exists in the sensitive area, alarming information is sent to a terminal device to enable the terminal device to prompt alarm.

In the embodiment of the present disclosure, the server acquires the monitoring video, and judges whether the monitoring target exists in the sensitive area; when the monitoring target exists in the sensitive area, the server sends the alarming information to the terminal device to enable the terminal device to prompt alarm, thereby preventing occurrence of an unsafe event.

In another embodiment of the present disclosure, the judging whether the monitoring target exists in the sensitive area includes: judging whether a moving target exists in the monitoring video; when the moving target exists in the monitoring video, judging whether the moving target is the monitoring target; when the moving target is the monitoring target, judging whether the monitoring target is located in the sensitive area; and when the monitoring target is located in the sensitive area, determining that the monitoring target exists in the sensitive area.

Herein, the server judges whether the moving target exists in the monitoring video; when the moving target exists in the monitoring video, the server judges whether the moving target is the monitoring target, thereby effectively judging whether the monitoring target exists in the monitoring video and further effectively judging whether the monitoring target is located in the sensitive area.

In another embodiment of the present disclosure, the judging whether the monitoring target exists in the sensitive area includes: judging whether a moving target exists in the sensitive area; when the moving target exists in the sensitive area, judging whether the moving target is the monitoring target; and when the moving target is the monitoring target, determining that the monitoring target exists in the sensitive area.

Herein, the server judges whether the moving target exists in the sensitive area; when the moving target exists in the sensitive area, the server judges whether the moving target is the monitoring target, thereby effectively judging whether the monitoring target exists in the sensitive area; and moreover, the server is not required to detect other areas except the sensitive area, so that interference of the other areas except the sensitive area in the monitoring video on a detection result is effectively avoided, and detection efficiency and detection accuracy are improved.

In another embodiment of the present disclosure, the judging whether the moving target is the monitoring target includes: determining a characteristic of the moving target; determining a matching degree between the characteristic of the moving target and a characteristic of the monitoring target; and when the matching degree is greater than a predefined threshhold value, determining that the moving target is the monitoring target.

When the matching degree between the characteristic of the moving target and the characteristic of the monitoring target is greater than the predefined threshhold value, it is indicated that a difference between the characteristic of the moving target and the characteristic of the monitoring target is relatively small, that is, the moving target is very likely to be the monitoring target. Therefore, whether the moving target is the monitoring target may be effectively judged based on the matching degree between the characteristic of the moving target and the characteristic of the monitoring target, and accuracy in determination of the monitoring target may be improved.

In another embodiment of the present disclosure, the determining the characteristic of the moving target includes: in a video image of the monitoring video, cutting an area where the moving target is located to obtain a target image; and performing characteristic extraction on the target image to obtain the characteristic of the moving target.

Herein, the server cuts the area where the moving target is located to obtain the target image, so that the server may conveniently perform characteristic extraction on the target image to obtain the characteristic of the moving target, and characteristic extraction efficiency is improved.

In another embodiment of the present disclosure, before determining the matching degree between the characteristic of the moving target and the characteristic of the monitoring target, the method further includes: receiving setting information sent from the terminal device, the setting information containing monitoring target identification information; acquiring a tracking video of the monitoring target from a stored historical video based on the monitoring target identification information; acquiring a tracking image of the monitoring target from each frame of video image of the tracking video; and performing characteristic extraction on the tracking image of the monitoring target to obtain the characteristic of the monitoring target.

Herein, the server acquires the tracking image of the monitoring target from each frame of video image of the tracking video of the monitoring target, and performs characteristic extraction on the tracking image, so that characteristic extraction accuracy is improved.

In another embodiment of the present disclosure, the setting information also contains sensitive area information corresponding to the monitoring target, and the sensitive area information is used to determine the sensitive area.

Herein, the setting information contains the sensitive area corresponding to the monitoring target, so that the server may conveniently judge whether the monitoring target exists in the sensitive area based on the sensitive area.

In another embodiment of the present disclosure, the judging whether the monitoring target is located in the sensitive area includes: performing target tracking on the monitoring target to obtain a current location of the monitoring target; and judging whether the monitoring target is located in the sensitive area based on the current location of the monitoring target.

In order to judge whether the monitoring target is located in the sensitive area, the server is required to perform target tracking on the monitoring target to obtain the current location of the monitoring target, and may effectively judge whether the monitoring target is located in the sensitive area based on the current location of the monitoring target.

All the abovementioned optional technical solutions may be freely combined to form optional embodiments of the present disclosure, and will not be elaborated one by one in the embodiment of the present disclosure.

Figure 3:
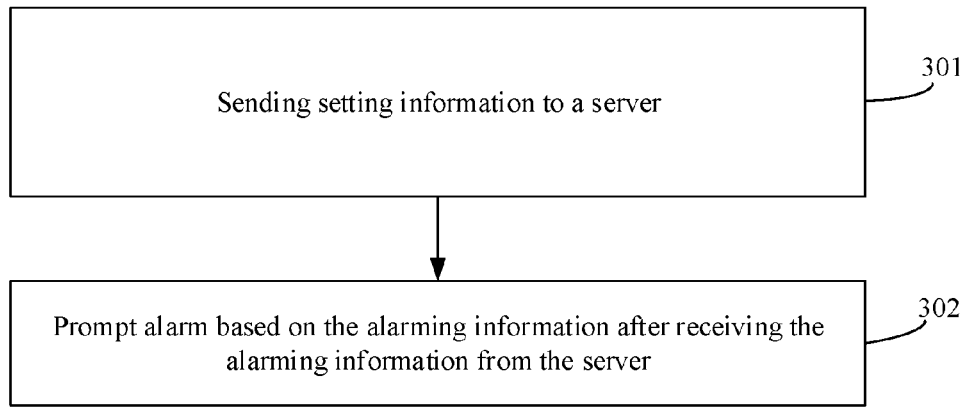
FIG. 3 is a flow chart showing another alarming method, according to an exemplary embodiment.

FIG. 3 is a flow chart showing another alarming method, according to an exemplary embodiment. As shown in FIG. 3, the method includes the following steps.

At step 301, setting information is sent to a server, the setting information containing monitoring target identification information and sensitive area information corresponding to a monitoring target in the setting information, and enabling the server to acquire a monitoring video and send alarming information to the terminal device when the monitoring target exists in a sensitive area.

At step 302, alarming is performed based on the alarming information after receiving the alarming information from the server.

In the embodiment of the present disclosure, a terminal device sends the setting information to the server, the setting information contains the monitoring target identification information and the sensitive area information corresponding to the monitoring target, so as to enable the server to acquire the monitoring video and send the alarming information to the terminal device when the monitoring target exists in the sensitive area; when the terminal device receives the alarming information, the terminal device may prompt alarm, thereby preventing occurrence of an unsafe event.

In another embodiment of the present disclosure, before sending the setting information to the server, the method further includes: acquiring a historical video, and playing the historical video; and determining the monitoring target identification information and the sensitive area information corresponding to the monitoring target based on a video image of the historical video in a process of playing the historical video.

The server is required to judge whether the monitoring target exists in the sensitive area, so that the server is required to determine the sensitive area and the monitoring target; and the terminal device determines the monitoring target identification information and the sensitive area corresponding to the monitoring target based on the video image of the historical video sent from the server, so that the server may rapidly determine the sensitive area and the monitoring target based on the setting information when receiving the setting information.

In another embodiment of the present disclosure, the determining the monitoring target identification information and the sensitive area information corresponding to the monitoring target based on the video image of the historical video includes: when a first selection instruction is received based on the video image of the historical video, determining an object selected by the first selection instruction as the monitoring target; when a second selection instruction is received based on the video image of the historical video, determining an area selected by the second selection instruction as the sensitive area corresponding to the monitoring target; and acquiring the monitoring target identification information of the monitoring target, and acquiring the sensitive area information of the sensitive area.

In order to prevent occurrence of an unsafe event when the monitoring target is located in the sensitive area, a user corresponding to the terminal device is required to select the monitoring target and the sensitive area based on the video image of the historical video to enable the server to monitor the monitoring target and the sensitive area.

In another embodiment of the present disclosure, the determining the monitoring target identification information and the sensitive area information corresponding to the monitoring target based on the video image of the historical video includes: acquiring a first area drawn in the video image of the historical video and a target object selected in the video image. Herein the target object is an object included in a second area drawn in the video image, or the target object is an object selected by a selection operation detected in the video image; when a preset gesture operation is detected on at least one of the first area and the target object, determining the first area as the sensitive area corresponding to the monitoring target, and determining the target object as the monitoring target; and acquiring the monitoring target identification information of the monitoring target, and acquiring the sensitive area information of the sensitive area.

Herein, the terminal device acquires the first area drawn in the video image of the historical video and the target object selected in the video image; when the preset gesture operation is detected on at least one of the first area and the target object, it determines the first area as the sensitive area corresponding to the monitoring target and determines the target object as the monitoring target, so that the sensitive area and the target object may be simply and directly determined, simplicity in operation is ensured, and moreover, monitoring target identification information and sensitive area information determination accuracy of the terminal device is improved.

All the abovementioned optional technical solutions may be freely combined to form optional embodiments of the present disclosure, and will not be elaborated one by one in the embodiment of the present disclosure.

Figure 4:
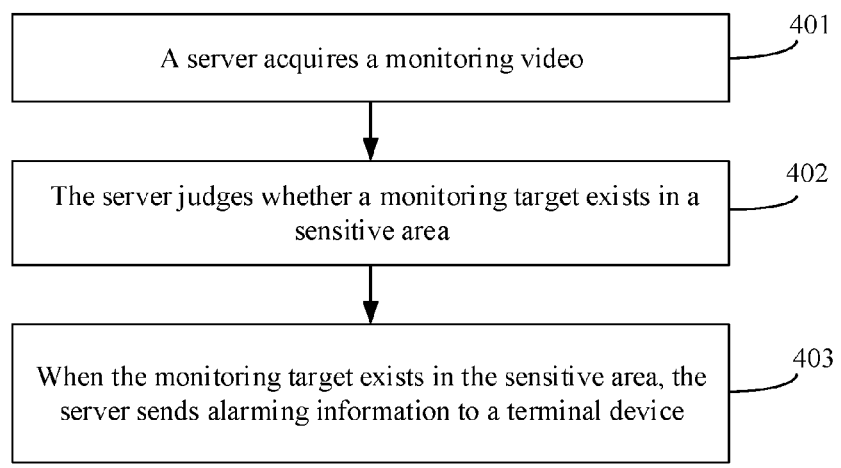
FIG. 4 is a flow chart showing another alarming method, according to an exemplary embodiment.

FIG. 4 is a flow chart showing another alarming method, according to an exemplary embodiment. As shown in FIG. 4, the method includes the following steps.

At step 401, a monitoring video is acquired by a server.

It is important to note that the server may acquire the monitoring video from an intelligent photographic equipment; of course, the intelligent photographic equipment may also send the monitoring video to other equipment, and then the server may acquire the monitoring video from the other equipment. There is no limit specifically made in the embodiment of the present disclosure.

Herein, the intelligent photographic equipment is used to determine the monitoring video in a monitoring area, and the process of acquiring the monitoring video in the monitoring area by the intelligent photographic equipment may be referred to the related art and will not be limited in the embodiment of the present disclosure.

In addition, the intelligent photographic equipment may communicate with the server or the other equipment through a wired network or a wireless network; when the intelligent photographic equipment communicates with the server or the other equipment through the wireless network, the intelligent photographic equipment may communicate with the server or the other equipment through a built-in Wireless Fidelity (WIFI) communication chip, a BlueTooth (BT) communication chip or other wireless communication chips. There is no limit specifically made in the embodiment of the present disclosure.

At step 402, the server judges whether a monitoring target exists in a sensitive area.

In order to prevent occurrence of an unsafe event when the monitoring target is located in the sensitive area, the server is required to judge whether the monitoring target exists in the sensitive area, and there may be the following two manners for the server to judge whether the monitoring target exists in the sensitive area.

Manner 1: the server judges whether a moving target exists in the monitoring video. When the moving target exists in the monitoring video, the server judges whether the moving target is the monitoring target. When the moving target is the monitoring target, the server judges whether the monitoring target is located in the sensitive area. When the monitoring target is located in the sensitive area, the server determines that the monitoring target exists in the sensitive area.

The intelligent photographic equipment is usually fixed, that is, the intelligent photographic equipment acquires a monitoring video in a fixed monitoring area. In order to judge whether the moving target exists in the monitoring video, a background model of a background in the fixed monitoring area may be established. Therefore, a foreground image in the fixed monitoring area may be determined by comparing each frame of video image in the monitoring video with the background model. Herein the foreground image refers to an image of any meaningful moving object under the assumption that the background is still.

Therefore, the operation that the server judges whether the moving target exists in the monitoring video may be implemented as follows: for each frame of video image in the monitoring video, the server acquires pixel value of each pixel in the video image, judges whether foreground pixels exist in the video image based on the pixel values of each pixel and a specified background model, determines that a moving target exists in the monitoring video when the foreground pixels exist in the video image, otherwise determines that no moving target exists in the monitoring video.

Herein, the specified background model is configured to represent a distribution characteristic of pixel values of each background pixel in the video image in time domain. The specified background model may be a mixed Gaussian model. Of course, the specified background model may also be other models. There is no limit specifically made in the embodiment of the present disclosure.

In addition, the specified background model may be pre-established. For example, the specified background model may be pre-established according to a distribution of the pixel value of each pixel in a specified video image of the monitoring video in time domain. Of course, the specified background model may also be established by other manners. There is no limit specifically made in the embodiment of the present disclosure.

A color characteristic is one of essential characteristics of an image, the color characteristic may be represented by a pixel value of a pixel of the image, and the pixel value refers to a numerical value such as a position, color and brightness of the pixel of the image, so that the server may judge whether the foreground pixels exist in the video image based on the pixel values of each pixel in the video image and the specified background model. When foreground pixels exist in the video image, it is indicated that there is a meaningful moving object in the video image, that is, a moving target exists in the monitoring video.

Herein, when the server judges whether the foreground pixels exist in the video image based on the pixel values of each pixel and the specified background model, the server may match the pixel values of each pixel and the specified background model, determine that the foreground pixels do not exist in the video image when the pixel values of each pixel are successfully matched with the specified background model, otherwise determine that the foreground pixels exist in the video image. Herein the foreground pixels are pixels corresponding to pixel values which are unsuccessfully matched with the specified background model.

In addition, a process of matching the pixel values of each pixel and the specified background model by the server may be referred to the related art, and will not be elaborated in detail in the embodiment of the present disclosure.

Furthermore, after the server determines that no moving target exists in the monitoring video, the server may also update the specified background model based on the pixel values of each pixel in the video image.

Since the specified background model is pre-established by the server, and the background may change under the influence of an unpredictable factor such as change of light, camera vibration and the like. Therefore, for avoiding a moving target detection error due to change accumulation caused by the unpredictable factors when applying the specified background model, when the server determines that the moving target does not exist in the monitoring video, the server may update the specified background model in real time based on the pixel values of each pixel in the video image so as to make the specified background model adaptive and be approaching the distribution characteristic of the pixel values of the current background pixels in time domain, thereby improving the moving target detection accuracy.

It is important to note that a process of updating the specified background model based on the pixel values of each pixel in the video image by the server may refer to the related art, and will not be elaborated in detail in the embodiment of the present disclosure.

Herein, when the moving target exists in the monitoring video, the operation that the server judges whether the moving target is the monitoring target may include steps (1)-(3).

(1) The server determines a characteristic of the moving target.

When the moving target exists in the monitoring video, the server is required to determine the characteristic of the moving target to judge whether the moving target is the monitoring target, and the operation that the server determines the characteristic of the moving target may be implemented as follows: in the video image of the monitoring video, the server cuts an area where the moving target is located to obtain a target image, and performs characteristic extraction on the target image to obtain the characteristic of the moving target.

Herein, when the server cuts the area where the moving target is located in the video image of the monitoring video to obtain the target image, the server may intercept an external rectangle of the moving target from the video image where the moving target is located, and determine the external rectangle as an image area, i.e., the target image, where the moving target is located in the monitoring video. Alternatively, the server may also acquire the foreground pixels from the video image where the moving target is located and combine the acquired foreground pixels to obtain the image area, i.e., the target image, where the moving target is located in the monitoring video. Alternatively, the server may also remove the background pixels in the video image where the moving target is located to obtain the image area, i.e., the target image, where the moving target is located in the monitoring video. Herein the background pixels are pixels corresponding to pixel values which are successfully matched with the specified background model.

In addition, when the server performs characteristic extraction on the target image, the server may perform characteristic extraction on the target image through a specified characteristic extraction algorithm. Herein the specified characteristic extraction algorithm may be a wavelet transform method, a least square method, a boundary method, a histogram method and the like, and will not be specifically limited in the embodiment of the present disclosure. A process of performing characteristic extraction on the target image by the server through the specified characteristic extraction algorithm may be referred to the related art, and will not be elaborated in detail in the embodiment of the present disclosure.

It is important to note that the moving target may have one characteristic, and may also have multiple characteristics, and the characteristic may be a color characteristic, a texture characteristic, a shape characteristic and the like. There is no limit specifically made in the embodiment of the present disclosure.

(2) The server determines a matching degree between the characteristic of the moving target and a characteristic of the monitoring target.

In order to judge whether the moving target is the monitoring target, the server is required to match the characteristic of the moving target and the characteristic of the monitoring target to determine the matching degree between the characteristic of the moving target and the characteristic of the monitoring target; when the server determines the matching degree between the characteristic of the moving target and the characteristic of the monitoring target, the server may match characteristics of the moving target and characteristics of the monitoring target respectively, determine the number of the characteristics which are successfully matched, then calculate a ratio of the number of the characteristics which are successfully matched to the number of the characteristics of the monitoring target, and determine the ratio as the matching degree between the characteristic of the moving target and the characteristic of the monitoring target. Alternatively, when the moving target has only one characteristic, the server determines a similarity between the characteristic of the moving target and the characteristic of the monitoring target to obtain a characteristic similarity, and determines the characteristic similarity as the matching degree between the characteristic of the moving target and the characteristic of the monitoring target; when the moving target has multiple characteristics, the server determines similarities between the multiple characteristics of the moving target and multiple characteristics of the monitoring target to obtain multiple characteristic similarities respectively, then calculates a weighted value of the multiple characteristic similarities, and determines the weighted value as the matching degree between the characteristics of the moving target and the characteristics of the monitoring target.

It is important to note that the monitoring target may have one or more characteristics, which will not be specifically limited in the embodiment of the present disclosure.

In addition, a process of matching the characteristic of the moving target and the characteristic of the monitoring target by the server may be referred to the related art, and will not be elaborated in detail in the embodiment of the present disclosure.

For example, if the number of the characteristics which are successfully matched is 4, and the number of the characteristics of the monitoring target is 5, the ratio of the number of the characteristics which are successfully matched to the number of the characteristics of the monitoring target is 0.8, and the server may determine 0.8 as the matching degree between the characteristics of the moving target and the characteristics of the monitoring target.

Herein, when the server calculates the weighted value of the multiple characteristic similarities, the server may multiply the multiple characteristic similarities by weights respectively corresponding to the multiple characteristics to obtain multiple numerical values, and add the multiple numerical values to obtain the weighted value of the multiple characteristic similarities.

It is important to note that the weights respectively corresponding to the multiple characteristics refer to magnitudes of reference functions which may be provided by the multiple characteristics respectively when whether the moving target is the monitoring target is judged, and the weights respectively corresponding to the multiple characteristics may be preset.

For example, if the moving target has only one characteristic and the characteristic is a color characteristic, the server matches the color characteristic of the moving target and a color characteristic of the monitoring target to obtain a color characteristic similarity 0.8, and then the server may determine 0.8 as the matching degree between the characteristic of the moving target and the characteristic of the monitoring target.

For another example, if the moving target has multiple characteristics and the multiple characteristics include a color characteristic and a texture characteristic respectively, the server matches the color characteristic of the moving target and the color characteristic of the monitoring target to obtain the color characteristic similarity 0.8, and matches the texture characteristic of the moving target and a texture characteristic of the monitoring target to obtain a texture characteristic similarity 0.6; if a weight corresponding to the color characteristic is assumed to be ½ and a weight corresponding to the texture characteristic is assumed to be ½, a weighted value of the color characteristic similarity and the texture characteristic similarity is: ½×0.8+½×0.6=0.7, and the server may determine 0.7 as the matching degree between the characteristics of the moving target and the characteristics of the monitoring target.

It is important to note that a process of determining the similarity between the characteristic of the moving target and the characteristic of the monitoring target by the server may be referred to the related art, and will not be elaborated in detail in the embodiment of the present disclosure.

Furthermore, before the server determines the matching degree between the characteristic of the moving target and the characteristic of the monitoring target, the server may also receive setting information sent from a terminal device, the setting information contains monitoring target identification information; the server may acquire a tracking video of the monitoring target from a stored historical video based on the monitoring target identification information, acquire a tracking image of the monitoring target from each frame of video image of the tracking video, and perform characteristic extraction on the tracking image of the monitoring target to obtain the characteristic of the monitoring target.

Herein, the setting information also contains sensitive area information corresponding to the monitoring target, and the sensitive area information is used to determine the sensitive area.

It is important to note that different monitoring targets may be distinguished by the monitoring target identification information. For example, when the monitoring target is a person, the monitoring target identification information may be a face characteristic and the like of the person; when the monitoring target is an object in a fixed shape, the monitoring target identification information may be the shape of the object; and when the monitoring target is a pet, the monitoring target identification information may be obtained by scanning a two-dimensional code of the pet. Of course, the monitoring target identification information may also be image information and the like of the monitoring target. There is no limit specifically made in the embodiment of the present disclosure.

It is also important to note that different sensitive areas may be distinguished by sensitive area information, the sensitive area information may be edge information of the sensitive area, and the edge information may be a coordinate of a pixel by which the video image passes on an edge of the sensitive area. Of course, the sensitive area information may also be information in other forms. There is no limit specifically made in the embodiment of the present disclosure.

In addition, when the server acquires the tracking video of the monitoring target from the stored historical video based on the monitoring target identification information, the server may acquire the tracking video of the monitoring target from the stored historical video through a specified tracking algorithm based on the monitoring target identification information, and the specified tracking algorithm may be a particle swarm optimization algorithm, a Continuously Adaptive Mean-SHIFT (CamShift) algorithm and the like, which is not specifically limited in the embodiment of the present disclosure. A process of acquiring the tracking video of the monitoring target from the stored historical video through the specified tracking algorithm based on the monitoring target identification information by the server may be referred to the related art, and will not be elaborated in detail in the embodiment of the present disclosure.

Moreover, when the server performs characteristic extraction on the tracking image of the monitoring target, the server may perform characteristic extraction on the tracking image of the monitoring target through a specified characteristic extraction algorithm, and a process of performing characteristic extraction on the tracking image of the monitoring target by the server through the specified characteristic extraction algorithm may be referred to the related art, and will not be elaborated in detail in the embodiment of the present disclosure.

It is important to note that the terminal device may also acquire the historical video before sending the setting information. For example, the terminal device sends a historical video acquisition request to the server, the server sends the historical video to the terminal device, and then the terminal device plays the historical video, and determines the monitoring target identification information and the sensitive area information corresponding to the monitoring target based on a video image of the historical video in a process of playing the historical video.

Herein, the operation that the terminal device determines the monitoring target identification information and the sensitive area information corresponding to the monitoring target based on the video image of the historical video may include: the terminal device determines an object selected by a first selection instruction as the monitoring target when receiving the first selection instruction based on the video image of the historical video, the terminal device determines an area selected by a second selection instruction as the sensitive area corresponding to the monitoring target when receiving the second selection instruction based on the video image of the historical video, and then the terminal device acquires the monitoring target identification information of the monitoring target and the sensitive area information of the sensitive area. Alternatively, the terminal device acquires a first area drawn in the video image of the historical video and a target object selected in the video image. Herein the target object is an object included in a second area drawn in the video image, or the target object is an object selected by a selection operation detected in the video image. When a preset gesture operation is detected on at least one of the first area and the target object, the terminal device determines the first area as the sensitive area corresponding to the monitoring target, and determines the target object as the monitoring target; and then the terminal device acquires the monitoring target identification information of the monitoring target, and acquires the sensitive area information of the sensitive area.

Herein, the first selection instruction is configured to select the monitoring target from objects included in the video image of the historical video, the first selection instruction may be triggered by a user, the user may trigger the first selection instruction through first specified operation, and the first specified operation may be single-click operation, double-click operation and the like, which is not specifically limited in the embodiment of the present disclosure.

In addition, the second selection instruction is configured to select the sensitive area corresponding to the monitoring target from areas included in the video image of the historical video, and the second selection instruction may be triggered by the user through a second specified operation, and the second specified operation may be a swipe operation and the like, which is not specifically limited in the embodiment of the present disclosure.

Herein, both the first area and the second area are closed areas or almost closed areas, the first area may include one or more areas, the second area may also include one or more areas, and the first area may include the second area, and may not include the second area, which is not specifically limited in the embodiment of the present disclosure.

In addition, the selection operation is configured to select the target object in the objects included in the video image, the selection operation may be triggered by the user, and the selection operation may be a single-click operation, a double-click operation and the like, which is not specifically limited in the embodiment of the present disclosure.

Moreover, the preset gesture operation is configured to determine the monitoring target and the sensitive area. The preset gesture operation may be triggered by the user, and the preset gesture operation may be a crossing operation, a ticking operation and the like, which is not specifically limited in the embodiment of the present disclosure.

For example, if the preset gesture operation is a crossing operation, the user draws the first area on the video image of the historical video and draws the second area on the video image, herein the second area includes the target object, and then the user crosses the first area or crosses the second area, or simultaneously crosses the first area and the second area, the terminal device may determine the first area as the sensitive area and determine the target object included in the second area as the monitoring target, and then the server may acquire a monitoring target identifier of the monitoring target and acquire a sensitive area identifier of the sensitive area.

For another example, the selection operation is a single-click operation, the preset gesture operation is a crossing operation. The user draws the first area in the video image of the historical video and single-clicks the target object in the video image, and then the user crosses the first area or crosses the target object, or crosses both the first area and the target object, the terminal device may determine the first area as the sensitive area and determine the target object as the monitoring target, and then the server may acquire the monitoring target identifier of the monitoring target and acquire the sensitive area identifier of the sensitive area.

It is important to note that the user may manually draw the first area on the video image and manually select the target object in the embodiment of the present disclosure, and may determine the first area as the sensitive area and determine the target object as the monitoring target through the preset gesture operation, so that the monitoring target and the sensitive area are simply and directly determined, and monitoring target and sensitive area determination efficiency of the terminal device is improved.

(3) When the matching degree between the characteristic of the moving target and the characteristic of the monitoring target is greater than a predefined threshhold value, the server determines that the moving target is the monitoring target, otherwise the server determines that the moving target is not the monitoring target.

When the matching degree between the characteristic of the moving target and the characteristic of the monitoring target is greater than the predefined threshhold value, it is indicated that a difference between the characteristic of the moving target and the characteristic of the monitoring target is relatively small, that is, the moving target is very likely to be the monitoring target, and the server may determine that the moving target is the monitoring target. When the matching degree between the characteristic of the moving target and the characteristic of the monitoring target is less than or equal to the predefined threshhold value, it is indicated that the difference between the characteristic of the moving target and the characteristic of the monitoring target is relatively large, that is, the moving target is unlikely to be the monitoring target, and the server may determine that the moving target is not the monitoring target.

It is important to note that the predefined threshhold value may be preset, for example, the predefined threshhold value may be 0.7, 0.8, 0.9 and the like, which is not specifically limited in the embodiment of the present disclosure.

For example, the predefined threshhold value is 0.7, the matching degree between the characteristic of the moving target and the characteristic of the monitoring target is 0.8, since 0.8 is greater than 0.7, the server may determine that the moving target is the monitoring target.

For another example, the matching degree between the characteristic of the moving target and the characteristic of the monitoring target is 0.6, since 0.6 is less than 0.7, the server may determine that the moving target is not the monitoring target.

Herein, when the moving target is the monitoring target, the operation that the server judges whether the monitoring target is located in the sensitive area may be implemented as follows: the server performs target tracking on the monitoring target to obtain a current location of the monitoring target, and further judges whether the monitoring target is located in the sensitive area based on the current location of the monitoring target.

Herein, when the server performs target tracking on the monitoring target to obtain the current location of the monitoring target, the server may perform target tracking on the monitoring target to obtain the tracking image of the monitoring target, and determine the current location of the monitoring target based on the tracking image and a specified coordinate system.

In addition, the specified coordinate system may be pre-established. For example, the specified coordinate system may be established based on the monitoring area of the intelligent photographic equipment. Of course, the specified coordinate system may also be established in another manner, for example, it may be established based on a lens of the intelligent photographic equipment, which is not specifically limited in the embodiment of the present disclosure.

It is important to note that the server may determine the current location of the monitoring target based on the tracking image and the specified coordinate system by virtue of a specified positioning algorithm when determining the current location of the monitoring target based on the tracking image and the specified coordinate system. The specified positioning algorithm may be preset, and the specified positioning algorithm may be an area growth algorithm, an area extension algorithm and the like, which is not specifically limited in the embodiment of the present disclosure. A process of determining the current location of the monitoring target based on the tracking image and the specified coordinate system by virtue of the specified positioning algorithm by the server may be referred to the related art, and will not be elaborated in detail in the embodiment of the present disclosure.

Herein, when the server judges whether the monitoring target is located in the sensitive area based on the current location of the monitoring target, the server determines a target area where the monitoring target is currently located based on the current location of the monitoring target, and judges whether the target area where the monitoring target is currently located and the sensitive area have an overlapped area; the server determines that the monitoring target is located in the sensitive area if the target area where the monitoring target is currently located and the sensitive area have the overlapped area; otherwise, the server determines that the monitoring target is not located in the sensitive area.

It is important to note that a process of judging whether the target area where the monitoring target is currently located and the sensitive area have the overlapped area by the server may be referred to the related art, and will not be elaborated in detail in the embodiment of the present disclosure.

Manner 2: the server judges whether a moving target exists in the sensitive area, judges whether the moving target is the monitoring target when the moving target exists in the sensitive area, and determines that the monitoring target exists in the sensitive area when the moving target is the monitoring target.

The sensitive area is usually fixed, and in order to judge whether the moving target exists in the sensitive area, an area background model may be established for the background in the sensitive area. Therefore, the foreground image in the sensitive area may be determined by comparing an area image of the sensitive area with the area background model; wherein the foreground image refers to the image of any meaningful moving object under the assumption that the background is still.

Therefore, the operation that the server judges whether the moving target exists in the sensitive area may be implemented as follows: for each frame of video image in the monitoring video, the server cut the sensitive area to obtain the area image of the sensitive area, and the server acquires pixel values of each pixel in the area image; the server judges whether foreground pixels exist in the area image based on the pixel values of each pixel and a specified area background model; when the foreground pixels exist in the area image, the server determines that the moving target exists in the sensitive area, otherwise determines that the moving target does not exist in the sensitive area.

Herein, the specified area background model is configured to represent a distribution characteristic of pixel values of each background pixel in the area image of the sensitive area on the time domain, the specified area background model may be a mixed Gaussian model, and of course, the specified area background model may also be another model. There is no limit specifically made in the embodiment of the present disclosure.

In addition, the specified area background model may be pre-established, for example, the specified area background model may be pre-established according to a distribution of the pixel values of each pixel in a specified area image of the sensitive area in time domain. Of course, the specified area background model may also be established by other manners. There is no limit specifically made in the embodiment of the present disclosure.

It is important to note that a process of judging whether the foreground pixels exist in the area image based on the pixel values of each pixel in the area image and the specified area background model by the server is similar to the judgment process in manner 1 in step 402, and will not be elaborated in the embodiment of the present disclosure.

Furthermore, after the server determines that no moving target exists in the sensitive area, the server may also update the specified area background model based on the pixel values of each pixel in the area image.

Herein, when the moving target exists in the sensitive area, a process of judging whether the moving target is the monitoring target by the server is similar to the judgment process in manner 1 in step 402, and will not be elaborated in the embodiment of the present disclosure.

It is important to note that whether the monitoring target exists in the sensitive area may be determined only by detecting the area image of the sensitive area in manner 2, so that interference of images of other areas except the sensitive area in the video image to the detection result is effectively avoided, and detection efficiency and detection accuracy are improved.

At step 403, when the monitoring target exists in the sensitive area, the server sends alarming information to the terminal device to enable the terminal device to prompt alarm.

When the monitoring target exists in the sensitive area, the server may send the alarming information to the terminal device to prevent occurrence of the unsafe event. Herein the alarming information is configured to prompt the user that the monitoring target is located in the sensitive area.

It is important to note that the terminal device may be connected with the server through the wired network or the wireless network.

In addition, when the terminal device performs alarming, the terminal device may directly play the alarming information through a speaker on the terminal device, and of course, the terminal device may prompt alarm in another manner, which is not specifically limited in the embodiment of the present disclosure.

In the embodiment of the present disclosure, the server acquires the monitoring video, and judges whether the monitoring target exists in the sensitive area, and when the monitoring target exists in the sensitive area, the server sends the alarming information to the terminal device to enable the terminal device to prompt alarm, thereby preventing occurrence of the unsafe event.

Figure 5:
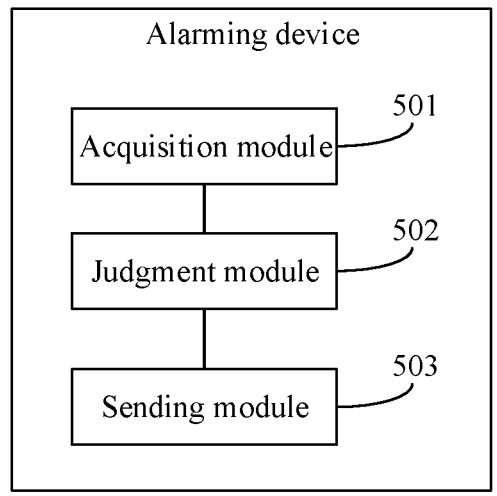
FIG. 5 is a block diagram of a first alarming device, according to an exemplary embodiment.

FIG. 5 is a block diagram of a first alarming device, according to an exemplary embodiment. Referring to FIG. 5, the device includes an acquisition module 501, a judgment module 502 and a sending module 503.

The acquisition module 501 is used to determine a monitoring video from a photographing device. Herein the photographing device captures the monitoring video by monitoring a region including a sensitive area.

The judgment module 502 is configured to judge whether a monitoring target exists in a sensitive area by analyzing the monitoring video.

The sending module 503 is configured to, when the monitoring target exists in the sensitive area, send alarming information to a terminal device to enable the terminal device to prompt alarm.

Figure 6:
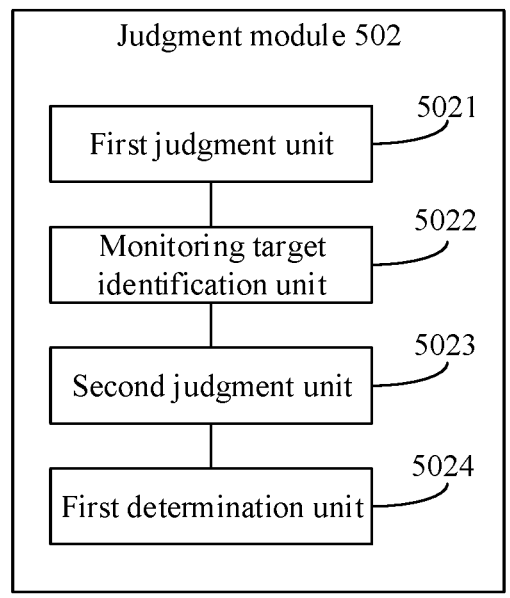
FIG. 6 is a block diagram of a judgment module, according to an exemplary embodiment.

In another embodiment of the present disclosure, referring to FIG. 6, the judgment module 502 includes a first judgment unit 5021, a monitoring target identification unit 5022, a second judgment unit 5023 and a first determination unit 5024.

The first judgment unit 5021 is configured to judge whether a moving target exists in the monitoring video.

The monitoring target identification unit 5022 is configured to, when the moving target exists in the monitoring video, judge whether the moving target is the monitoring target.

The second judgment unit 5023 is configured to, when the moving target is the monitoring target, judge whether the monitoring target is located in the sensitive area.

The first determination unit 5024 is configured to, when the monitoring target is located in the sensitive area, determine that the monitoring target exists in the sensitive area.

Figure 7:
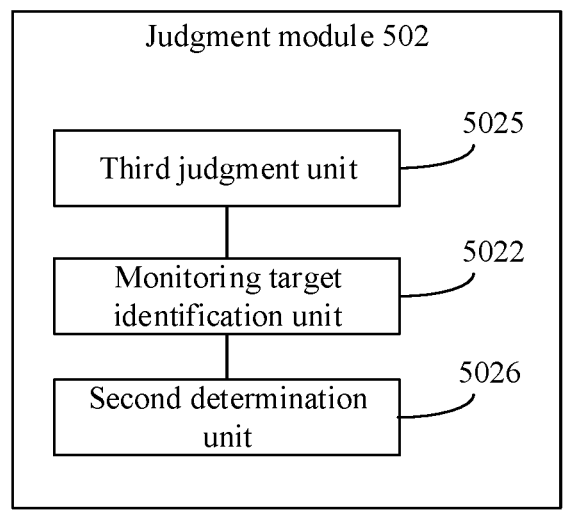
FIG. 7 is a block diagram of another judgment module, according to an exemplary embodiment.

In another embodiment of the present disclosure, referring to FIG. 7, the judgment module 502 includes a third judgment unit 5025, a monitoring target identification unit 5022 and a second determination unit 5026.

The third judgment unit 5025 is configured to judge whether a moving target exists in the sensitive area.

The monitoring target identification unit 5022 is configured to, when the moving target exists in the sensitive area, judge whether the moving target is the monitoring target.

The second determination unit 5026 is configured to, when the moving target is the monitoring target, determine that the monitoring target exists in the sensitive area.

Figure 8:
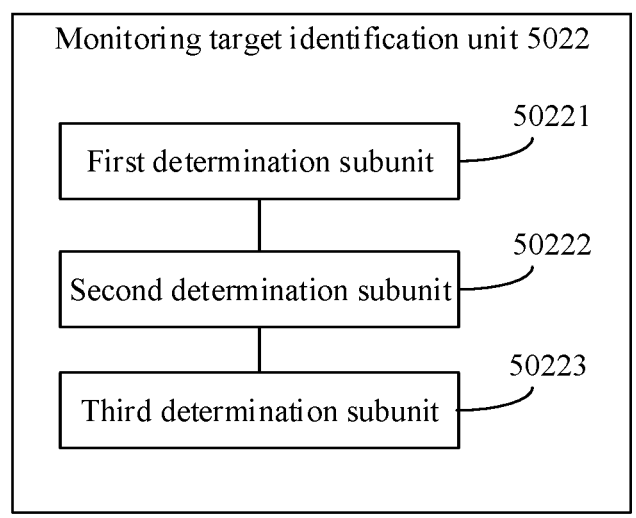
FIG. 8 is a block diagram of a monitoring target identification unit, according to an exemplary embodiment.

In another embodiment of the present disclosure, referring to FIG. 8, the monitoring target identification unit 5022 includes a first determination subunit 50221, a second determination subunit 50222 and a third determination subunit 50223.

The first determination subunit 50221 is configured to determine a characteristic of the moving target.

The second determination subunit 50222 is configured to determine a matching degree between the characteristic of the moving target and a characteristic of the monitoring target.

The third determination subunit 50223 is configured to, when the matching degree is greater than a predefined threshhold value, determine that the moving target is the monitoring target.

In another embodiment of the present disclosure, the first determination subunit 50221 is configured to, when the moving target exists in the monitoring video, cut an area where the moving target is located in a video image of the monitoring video to obtain a target image; and perform characteristic extraction on the target image to obtain the characteristic of the moving target.

Figure 9:
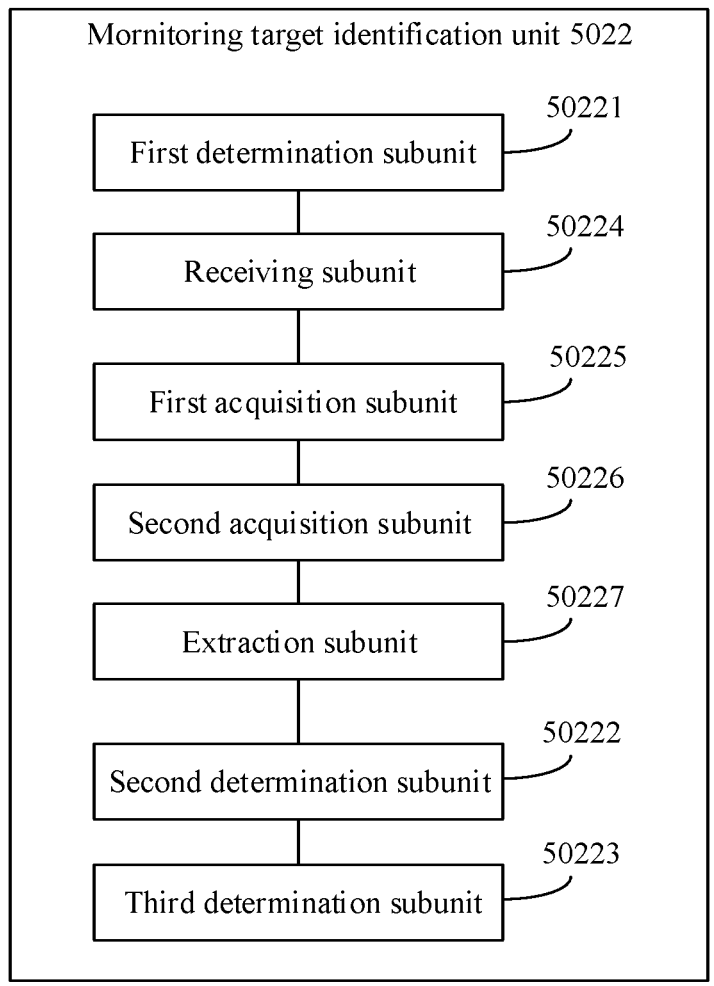
FIG. 9 is a block diagram of another monitoring target identification unit, according to an exemplary embodiment.

In another embodiment of the present disclosure, referring to FIG. 9, the monitoring target identification unit 5022 further includes a receiving subunit 50224, a first acquisition subunit 50225, a second acquisition subunit 50226 and an extraction subunit 50227.

The receiving subunit 50224 is configured to receive setting information sent from the terminal device, herein the setting information contains monitoring target identification information.

The first acquisition subunit 50225 is used to determine a tracking video of the monitoring target from a stored historical video based on the monitoring target identification information.

The second acquisition subunit 50226 is used to determine a tracking image of the monitoring target from each frame of video image of the tracking video.

The extraction subunit 50227 is configured to perform characteristic extraction on the tracking image of the monitoring target to obtain the characteristic of the monitoring target.

In another embodiment of the present disclosure, the setting information also contains sensitive area information corresponding to the monitoring target, and the sensitive area information is used to determine the sensitive area.

Figure 10:
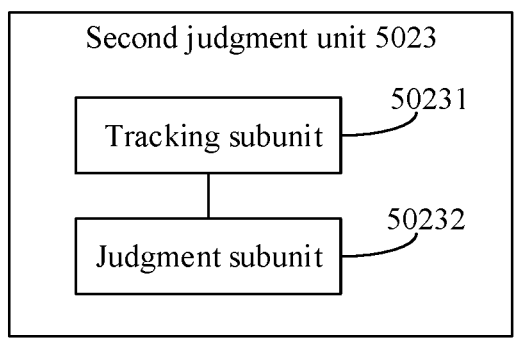
FIG. 10 is a block diagram of a second judgment unit, according to an exemplary embodiment.

In another embodiment of the present disclosure, referring to FIG. 10, the second judgment unit 5023 includes a tracking subunit 50231 and a judgment subunit 50232.

The tracking subunit 50231 is configured to, when the moving target is the monitoring target, perform target tracking on the monitoring target to obtain a current location of the monitoring target.

The judgment subunit 50232 is configured to judge whether the monitoring target is located in the sensitive area based on the current location of the monitoring target.

In the embodiment of the present disclosure, the server acquires the monitoring video, and judges whether the monitoring target exists in the sensitive area; when the monitoring target exists in the sensitive area, the server sends the alarming information to the terminal device to enable the terminal device to prompt alarm, thereby preventing occurrence of an unsafe event.

With respect to the devices in the above embodiments, the specific manners for performing operations for individual modules therein have been described in detail in the embodiments regarding the related methods, which will not be elaborated herein.

Figure 11:
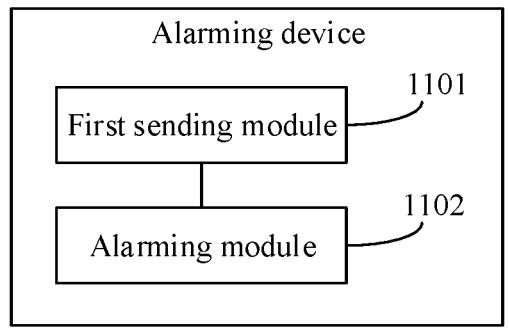
FIG. 11 is a block diagram of a second alarming device, according to an exemplary embodiment.

FIG. 11 is a block diagram of a second alarming device, according to an exemplary embodiment. Referring to FIG. 11, the device includes a first sending module 1101 and an alarming module 1102.

The first sending module 1101 is configured to send setting information to a server, herein the setting information contains monitoring target identification information and sensitive area information corresponding to a monitoring target, to enable the server to acquire a monitoring video and send alarming information to the terminal device when the monitoring target exists in a sensitive area.

The alarming module 1102 is configured to prompt alarm based on the alarming information after receiving the alarming information from the server.

Figure 12:
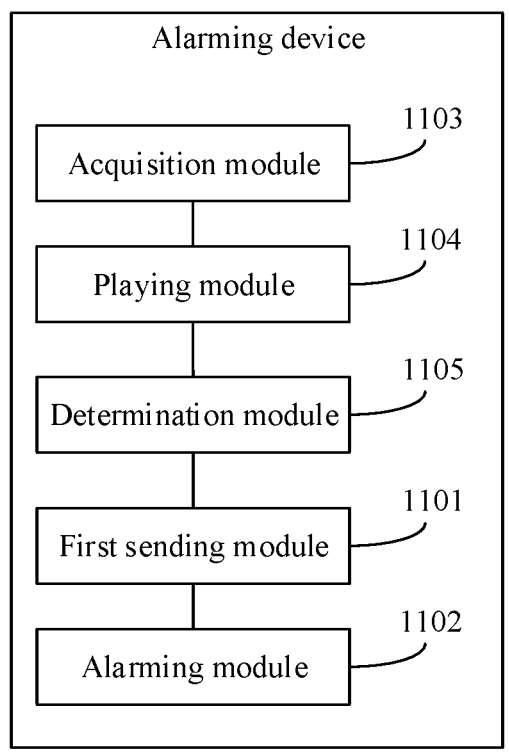
FIG. 12 is a block diagram of a third alarming device, according to an exemplary embodiment.

In another embodiment of the present disclosure, referring to FIG. 12, the device further includes an acquisition module 1103, a playing module 1104 and a determination module 1105.

The acquisition module 1103 is configured to acquire a historical video.

The playing module 1104 is configured to play the historical video.

The determination module 1105 is configured to determine the monitoring target identification information and the sensitive area information corresponding to the monitoring target based on a video image of the historical video in a process of playing the historical video.

Figure 13:
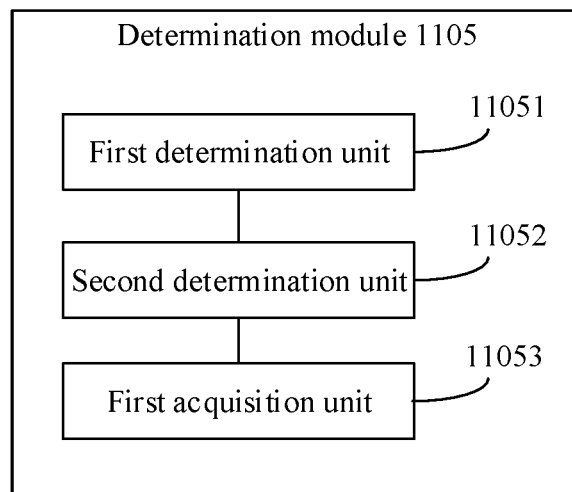
FIG. 13 is a block diagram of a determination module, according to an exemplary embodiment.

In another embodiment of the present disclosure, referring to FIG. 13, the determination module 1105 includes a first determination unit 11051, a second determination unit 11052 and a first acquisition unit 11053.

The first determination unit 11051 is configured to, when a first selection instruction is received based on the video image of the historical video in the process of playing the historical video, determine an object selected by the first selection instruction as the monitoring target.

The second determination unit 11052 is configured to, when a second selection instruction is received based on the video image of the historical video, determine an area selected by the second selection instruction as the sensitive area corresponding to the monitoring target.

The first acquisition unit 11053 is configured to acquire the monitoring target identification information of the monitoring target, and acquire the sensitive area information of the sensitive area.

Figure 14:
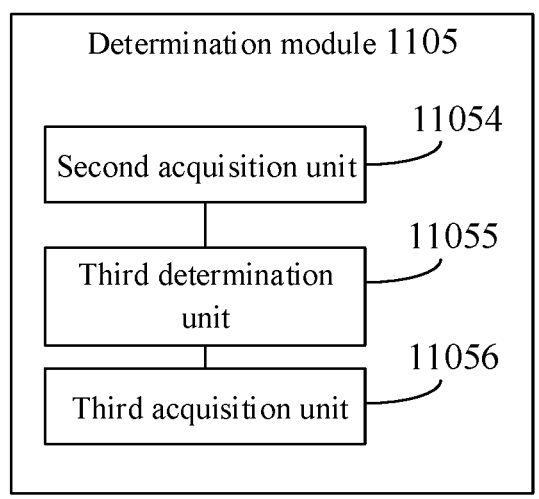
FIG. 14 is a block diagram of another determination module, according to an exemplary embodiment.

In another embodiment of the present disclosure, referring to FIG. 14, the determination module 1105 includes a second acquisition unit 11054, a third determination unit 11055 and a third acquisition unit 11056.

The second acquisition unit 11054 is configured to acquire a first area drawn in the video image of the historical video and a target object selected in the video image, wherein the target object is an object included in a second area drawn in the video image, or alternatively, the target object is an object selected by selection operation detected in the video image.

The third determination unit 11055 is configured to, when preset gesture operation is detected on at least one of the first area and the target object, determine the first area as the sensitive area corresponding to the monitoring target, and determine the target object as the monitoring target.

The third acquisition unit 11056 is configured to acquire the monitoring target identification information of the monitoring target, and acquire the sensitive area information of the sensitive area.

In the embodiment of the present disclosure, a terminal device sends the setting information to the server, herein the setting information contains the monitoring target identification information and the sensitive area information corresponding to the monitoring target, so as to enable the server to acquire the monitoring video and send the alarming information to the terminal device when the monitoring target exists in the sensitive area; when the terminal device receives the alarming information, the terminal device may prompt alarm, thereby preventing occurrence of an unsafe event.

With respect to the devices in the above embodiments, the specific manners for performing operations for individual modules therein have been described in detail in the embodiments regarding the related methods, which will not be elaborated herein.

Figure 15:
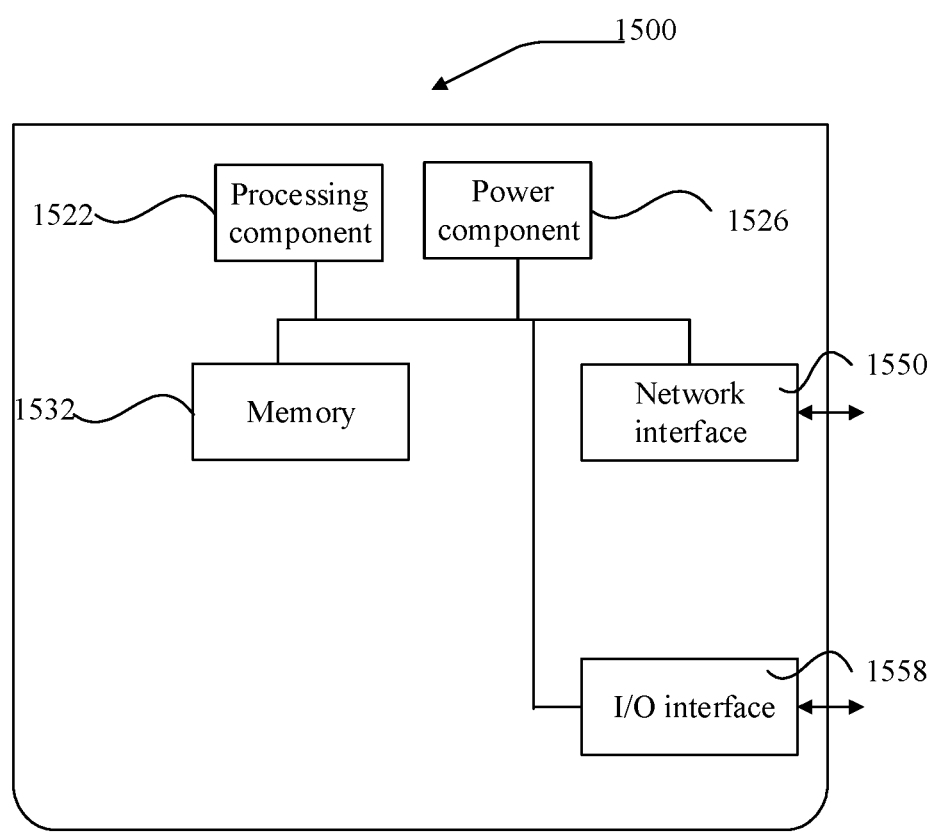
FIG. 15 is a block diagram of a device, according to an exemplary embodiment.

FIG. 15 is a block diagram of a device 1500, according to an exemplary embodiment. For example, the device 1500 may be provided as a server. Referring to FIG. 15, the device 1500 includes a processing component 1522, which further includes one or more processors, and a memory resource represented by a memory 1532, configured to store instructions such as application programs executable for the processing component 1522. The application programs stored in the memory 1532 may include one or more than one module of which each corresponds to a set of instructions.

The device 1500 may further include a power component 1526 configured to execute power management of the device 1500, a wired or wireless network interface 1550 configured to connect the device 1500 to a network, and an Input/Output (I/O) interface 1558. The device 1500 may be operated based on an operating system stored in the memory 1532, such as Windows Server™, Mac OS X™, Unix™, Linux™, FreeBSD™ and the like.

In addition, the processing component 1522 is configured to execute the instructions to execute the above described alarming methods.

Figure 16:
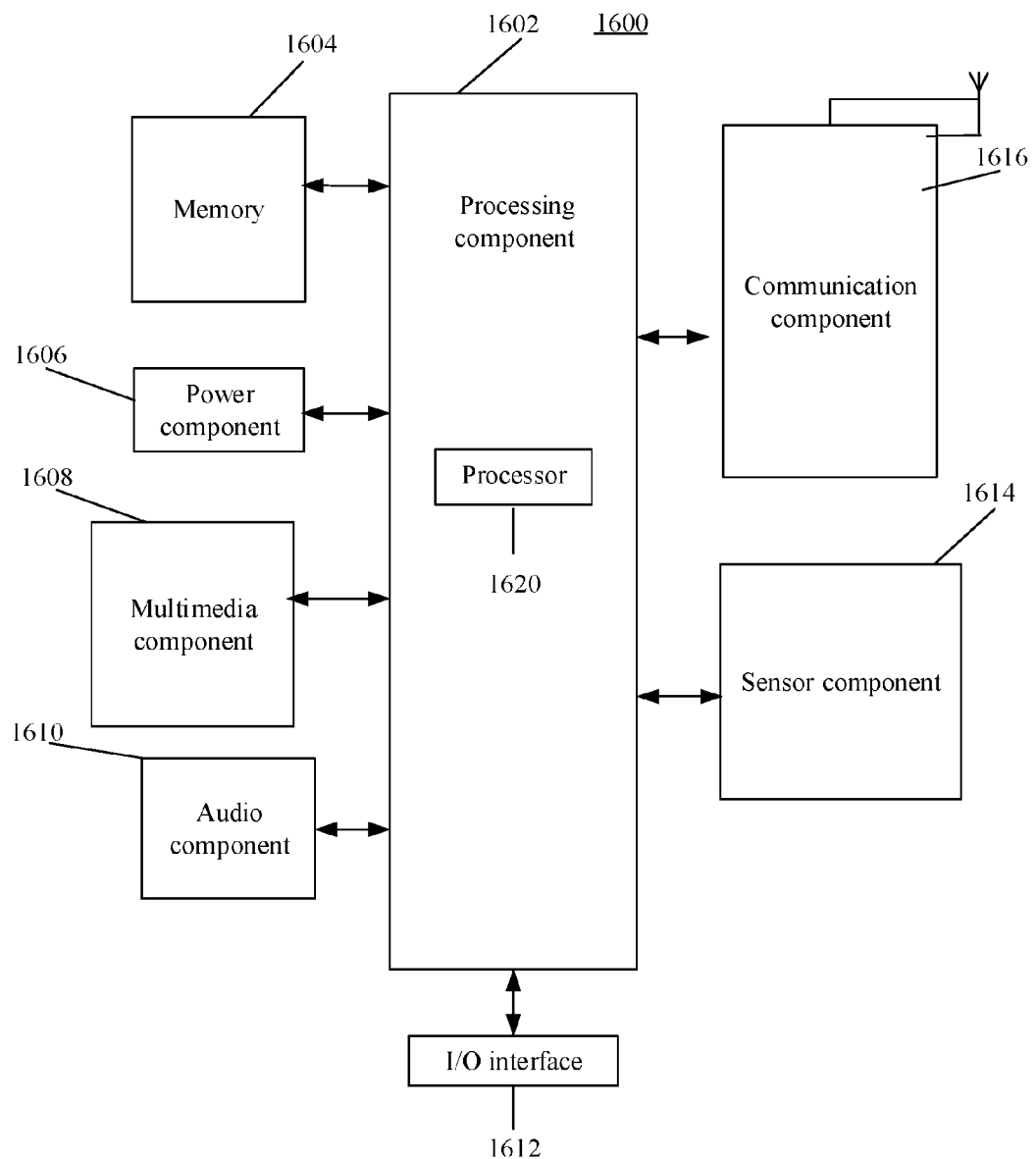
FIG. 16 is a block diagram of another device, according to an exemplary embodiment.

FIG. 16 is a block diagram of a device 1600, according to an exemplary embodiment. For example, the device 1600 may be provided as a terminal device such as a mobile phone, a computer, a digital broadcast terminal device, a messaging device, a tablet, a medical device, exercise equipment, a personal digital assistant and the like.

Referring to FIG. 16, the device 1600 may include one or more of the following components: a processing component 1602, a memory 1604, a power component 1606, a multimedia component 1608, an audio component 1610, an I/O interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the abovementioned methods. Moreover, the processing component 1602 may include one or more modules which facilitate interaction between the processing component 1602 and the other components. For instance, the processing component 1602 may include a multimedia module to facilitate interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video and the like. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 provides power for various components of the device 1600. The power component 1606 may include a power management system, one or more power supplies, and other components associated with the generation, management and distribution of power for the device 1600.

The multimedia component 1608 includes a screen providing an output interface between the device 1600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1608 includes a front camera and/or a rear camera. The front camera and/or the rear camera may receive external multimedia data when the device 1600 is in an operation mode, such as a photographing mode or a video mode. Each of the front camera and the rear camera may be a fixed optical lens system or have focusing and optical zooming capabilities.

The audio component 1610 is configured to output and/or input an audio signal. For example, the audio component 1610 includes a microphone (MIC), and the MIC is configured to receive an external audio signal when the device 1600 is in the operation mode, such as a call mode, a recording mode and a voice recognition mode. The received audio signal may be further stored in the memory 1604 or sent through the communication component 1616. In some embodiments, the audio component 1610 further includes a speaker configured to output the audio signal.

The I/O interface 1612 provides an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 includes one or more sensors configured to provide status assessment in various aspects for the device 1600. For instance, the sensor component 1614 may detect an on/off status of the device 1600 and relative positioning of components, such as a display and small keyboard of the device 1600, and the sensor component 1614 may further detect a change in a position of the device 1600 or a component of the device 1600, presence or absence of contact between the user and the device 1600, orientation or acceleration/deceleration of the device 1600 and a change in temperature of the device 1600. The sensor component 1614 may include a proximity sensor configured to detect presence of an object nearby without any physical contact. The sensor component 1614 may also include a light sensor, such as a Complementary Metal Oxide Semiconductor (CMOS) or Charge Coupled Device (CCD) image sensor, configured for use in an imaging application. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and another device. The device 1600 may access a communication-standard-based wireless network, such as a WIFI network, a 2nd-Generation (2G) or 3rd-Generation (3G) network or a combination thereof. In an exemplary embodiment, the communication component 1616 receives a broadcast signal or broadcast associated information from an external broadcast management system through a broadcast channel. In an exemplary embodiment, the communication component 1616 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a BT technology and another technology.

In the exemplary embodiment, the device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned methods.

In the exemplary embodiment, there is also provided a non-transitory computer-readable storage medium including instructions, such as the memory 1604 including instructions, and the instructions may be executed by the processor 1620 of the device 1600 to implement the abovementioned methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to the non-transitory computer-readable storage medium, when the instructions in the storage medium are executed by a processor of a terminal device, the terminal device may execute the above described alarming methods.

In the embodiment of the present disclosure, the terminal device sends the setting information, herein the setting information contains the monitoring target identification information and the sensitive area information corresponding to the monitoring target, so as to enable the server to acquire the monitoring video and send the alarming information to the terminal device when the monitoring target exists in the sensitive area; when the terminal device receives the alarming information, the terminal device may prompt alarm, thereby preventing occurrence of an unsafe event.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An alarming method implemented by a terminal device, comprising:
    sending setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and
    prompting alarm based on the alarming information after receiving the alarming information from the server;
    wherein before sending the setting information to the server, the method further comprising:
    acquiring a historical video, and playing the historical video; and
    determining the monitoring target identification information and the sensitive area information corresponding to the monitoring target based on a video image of the historical video in a process of playing the historical video;
        wherein determining the monitoring target identification information and the sensitive area information corresponding to the monitoring target based on the video image of the historical video comprises: when a first selection instruction is received based on the video image of the historical video, determining an object selected by the first selection instruction as the monitoring target; when a second selection instruction is received based on the video image of the historical video, determining an area selected by the second selection instruction as the sensitive area corresponding to the monitoring target; and acquiring the monitoring target identification information of the monitoring target, and acquiring the sensitive area information of the sensitive area; or
        wherein determining the monitoring target identification information and the sensitive area information corresponding to the monitoring target based on the video image of the historical video comprises: acquiring a first area drawn in the video image of the historical video and a target object selected in the video image, wherein the target object is an object included in a second area drawn in the video image, or the target object is an object selected by selection operation detected in the video image; when preset gesture operation is detected on at least one of the first area and the target object, determining the first area as the sensitive area corresponding to the monitoring target, and determining the target object as the monitoring target; and acquiring the monitoring target identification information of the monitoring target, and acquiring the sensitive area information of the sensitive area.

2. A terminal device, comprising:

a processor; and a memory configured to store instructions executable by the processor, wherein the processor is configured to:

send setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and prompt alarm based on the alarming information after receiving the alarming information from the server;

wherein before sending the setting information to the server, the method further comprising:

acquiring a historical video, and playing the historical video; and determining the monitoring target identification information and the sensitive area information corresponding to the monitoring target based on a video image of the historical video in a process of playing the historical video;

wherein determining the monitoring target identification information and the sensitive area information corresponding to the monitoring target based on the video image of the historical video comprises: when a first selection instruction is received based on the video image of the historical video, determining an object selected by the first selection instruction as the monitoring target; when a second selection instruction is received based on the video image of the historical video, determining an area selected by the second selection instruction as the sensitive area corresponding to the monitoring target; and acquiring the monitoring target identification information of the monitoring target, and acquiring the sensitive area information of the sensitive area; or wherein determining the monitoring target identification information and the sensitive area information corresponding to the monitoring target based on the video image of the historical video comprises: acquiring a first area drawn in the video image of the historical video and a target object selected in the video image, wherein the target object is an object included in a second area drawn in the video image, or the target object is an object selected by selection operation detected in the video image; when preset gesture operation is detected on at least one of the first area and the target object, determining the first area as the sensitive area corresponding to the monitoring target, and determining the target object as the monitoring target; and acquiring the monitoring target identification information of the monitoring target, and acquiring the sensitive area information of the sensitive area.

3. A non-transitory computer-readable storage medium having stored therein instructions that, when executed by a processor of a terminal device, causes the terminal device to perform an alarming method, the method comprising:

sending setting information to a server, wherein the setting information contains monitoring target identification information and sensitive area information corresponding to a monitoring target, wherein the server acquires a monitoring video from a photographing device and sends alarming information to the terminal device when the monitoring target exists in a sensitive area, and wherein the photographing device captures the monitoring video by monitoring a region including the sensitive area; and prompting alarm based on the alarming information after receiving the alarming information from the server;

wherein before sending the setting information to the server, the method further comprising:

acquiring a historical video, and playing the historical video; and determining the monitoring target identification information and the sensitive area information corresponding to the monitoring target based on a video image of the historical video in a process of playing the historical video;

wherein determining the monitoring target identification information and the sensitive area information corresponding to the monitoring target based on the video image of the historical video comprises: when a first selection instruction is received based on the video image of the historical video, determining an object selected by the first selection instruction as the monitoring target; when a second selection instruction is received based on the video image of the historical video, determining an area selected by the second selection instruction as the sensitive area corresponding to the monitoring target; and acquiring the monitoring target identification information of the monitoring target, and acquiring the sensitive area information of the sensitive area; or wherein determining the monitoring target identification information and the sensitive area information corresponding to the monitoring target based on the video image of the historical video comprises: acquiring a first area drawn in the video image of the historical video and a target object selected in the video image, wherein the target object is an object included in a second area drawn in the video image, or the target object is an object selected by selection operation detected in the video image; when preset gesture operation is detected on at least one of the first area and the target object, determining the first area as the sensitive area corresponding to the monitoring target, and determining the target object as the monitoring target; and acquiring the monitoring target identification information of the monitoring target, and acquiring the sensitive area information of the sensitive area.

* * * * *